(12) United States Patent
Wang et al.

(10) Patent No.: US 11,162,524 B2
(45) Date of Patent: Nov. 2, 2021

(54) FITTABLE AND RELEASABLE FASTENER

(71) Applicant: FIVETECH TECHNOLOGY INC., New Taipei (TW)

(72) Inventors: Ting-Jui Wang, New Taipei (TW); Tung-Jung Chang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 369 days.

(21) Appl. No.: 16/505,768

(22) Filed: Jul. 9, 2019

(65) Prior Publication Data

US 2020/0018342 A1 Jan. 16, 2020

(30) Foreign Application Priority Data

Jul. 13, 2018 (TW) ................................. 107124397

(51) Int. Cl.
*F16B 31/02* (2006.01)
(52) U.S. Cl.
CPC ..................................... *F16B 31/02* (2013.01)
(58) Field of Classification Search
CPC ...... F16B 19/109; F16B 21/165; F16B 31/02; F16B 39/32; Y10T 24/42
USPC ......................................... 411/1, 6, 298, 348
See application file for complete search history.

(56) References Cited

U.S. PATENT DOCUMENTS

| | | | | |
|---|---|---|---|---|
| 1,609,645 A | * | 12/1926 | Dewire | F16B 39/32 411/396 |
| 2,373,812 A | * | 4/1945 | Coop | B25B 5/101 411/6 |
| 2,634,650 A | * | 4/1953 | Coop | F16D 43/208 411/6 |
| 2,729,134 A | * | 1/1956 | Stanton, Jr. | F16B 31/02 411/6 |
| 2,745,303 A | * | 5/1956 | Cornelius | B25B 1/24 269/218 |
| 2,881,602 A | * | 4/1959 | Baker | E03B 9/02 464/35 |
| 3,255,796 A | * | 6/1966 | Tobey | F16B 39/10 411/298 |
| 3,282,316 A | * | 11/1966 | Griswold | H05K 7/1412 411/326 |
| 7,731,465 B2 | * | 6/2010 | Stapulionis | F16B 21/165 411/348 |
| 8,162,581 B2 | * | 4/2012 | Soltis | F16B 19/109 411/348 |

(Continued)

FOREIGN PATENT DOCUMENTS

JP H09242729 A 9/1997

*Primary Examiner* — Roberta S Delisle
(74) *Attorney, Agent, or Firm* — Schmeiser, Olsen & Watts, LLP

(57) ABSTRACT

A fittable and releasable fastener includes a head which has a fitted and released portion and a fastening portion; and a fitting and releasing piece which has a fitting and releasing portion. Accordingly, when the fitting and releasing portion fits to the fitted and released portion, an external turning force is applied to the fitting and releasing piece or the head to make the fastening portion combine with at least one object. After the fastening portion is combined with the object, the fitting and releasing portion would release the fitted and released portion to limit the force or the force interval applied on the fastening portion for preventing excessively locking if the force is continuously applied.

11 Claims, 2 Drawing Sheets

(56) References Cited

U.S. PATENT DOCUMENTS

| | | | |
|---|---|---|---|
| 8,870,149 B2 * | 10/2014 | Rodig | H05K 7/1412 248/503 |
| 10,451,102 B2 * | 10/2019 | Anderes | F16B 21/165 |

* cited by examiner

FITTABLE AND RELEASABLE FASTENER

CROSS-REFERENCE TO RELATED APPLICATION

This non-provisional application claims priority under 35 U.S.C. § 119(a) on Patent Application No(s).107124397 filed in Taiwan, R.O.C. on Jul. 13, 2018, the entire contents of which are hereby incorporated by reference.

BACKGROUND OF THE INVENTION

1. Field of the Invention

The present disclosure relates to a fittable and releasable fastener, and in particular to a fittable and releasable fastener which can be used to combine at least one object, and prevent excessively locking.

2. Description of the Related Art

When at least one object is combined, the combination of object is generally locked by screws.

Generally, the screws are screwed into an object by using a screwdriver for combination. However, when using a screwdriver to perform the locking, a user often turns the screws continuously after the screws are screwed into the object because the user worries that the locking is not secure. It may cause that the object is damaged by the excessive locking or the screw may get stripped.

Thus, it is desirable to have a fittable and releasable fastener which can prevent excessively locking that is to be actively disclosed by the invention.

BRIEF SUMMARY OF THE INVENTION

An objective of the present disclosure is to provide a fittable and releasable fastener, and in particular to a fittable and releasable fastener which can limit the force or the force interval applied on the fastening portion to prevent excessively locking.

To achieve at least the above objective and other objectives, a first aspect of the present disclosure provides a fittable and releasable fastener, comprising: a head and a fitting and releasing piece. The head has at least one fitted and released portion and a fastening portion. The head has a limiting portion, and the limiting portion combines moveably with a corresponding limiting portion provided by a body portion. The fitting and releasing piece has at least one fitting and releasing portion, and the fitting and releasing portion fits to the fitted and released portion. The fitting and releasing piece or the head is applied with an external force to make the fitting and releasing portion release the fitted and released portion for limiting the force or the force interval applied on the fastening portion.

In an embodiment, the fitting and releasing portion or the fitted and released portion comprises an elastomer and a pusher.

In an embodiment, the fitting and releasing portion or the fitted and released portion has a fitting and releasing surface and a stopping surface, a direction of the fitting and releasing surface is fittably and releasably turning, and a direction of the stopping surface is restrained from turning.

In an embodiment, the pusher is an arc surface body, spherical body or curved surface body, and the pusher can be driven or turned by a less force along a bevel, curved surface or arc surface of the fitting and releasing surface.

In an embodiment, the stopping surface is a vertical surface, step surface or a bevel, curved surface or arc surface with an angle larger than that of the fitting and releasing surface for stopping and restraining the pusher from turning, or restraining the pusher from moving with a force larger than that of the pusher driving the fitting and releasing surface.

In an embodiment, when the force is applied to the head to drive the fastening portion for the locking or fastening, the fitting and releasing portion releases the fitted and released portion along a fitting and releasing surface before the torque force or turning force applied to the fastening portion is larger than a bearable structural force on the corresponding fastened portion to prevent the corresponding fastened portion from being damaged by the fastening portion or failure.

In an embodiment, when the force is applied to the head to drive the fastening portion for removing the locking or fastening, the fitting and releasing portion abuts against a stopping surface so that the torque force or turning force applied to the fastening portion is transferred to the stopping surface by the fitting and releasing portion for removing the locking or fastening of the fastening portion to the corresponding fastened portion.

In an embodiment, when the force is applied to the head to drive the fastening portion for removing the locking or fastening, the fitting and releasing portion abuts against a stopping surface so that the torque force or turning force applied to the fastening portion is transferred to the stopping surface by the fitting and releasing portion, the force transferred to the stopping surface is larger than the fitting and releasing force of entering for lockably fastening or turnably fastening the fitting and releasing portion and the fitted and released portion in another direction, for removing the locking or fastening of the fastening portion to the corresponding fastened portion.

In an embodiment, when the force is applied to the head to drive the fastening portion for removing the locking or fastening, the fitting and releasing portion releases the fitted and released portion along a fitting and releasing surface before the torque force or turning force applied to the fastening portion is larger than the predetermined force on the fastening portion.

A second aspect of the present invention provides a fittable and releasable fastener, comprising a head and a fitting and releasing piece. The head has at least one fitted and released portion and a fastening portion; and the fitting and releasing piece has at least one fitting and releasing portion, and the fitting and releasing portion fits to the fitted and released portion, the fitting and releasing piece or the head is applied with an external force to make the fitting and releasing portion release the fitted and released portion for limiting the force or the force interval applied on the fastening portion, the fastening portion is used to fasten a corresponding fastened portion, and when the force is applied to the head to drive the corresponding fastened portion, the fitting and releasing portion releases the fitted and released portion before the torque force or turning force applied to the fastening portion is larger than a bearable or predetermined structural force on the corresponding fastened portion.

A third aspect of the present invention provides a fittable and releasable fastener, comprising: a head and a fitting and releasing piece. The head has at least one fitted and released portion and a fastening portion; and the fitting and releasing piece has at least one fitting and releasing portion, and the fitting and releasing portion fits to the fitted and released portion, the fitting and releasing piece or the head is applied with an external force to make the fitting and releasing portion release the fitted and released portion for limiting the force or the force interval applied on the fastening portion, the fastening portion is used to fasten a corresponding fastened portion, and when the force is applied to the head to drive the fastening portion for the locking or fastening, the fitting and releasing portion releases the fitted and released portion along a fitting and releasing surface before the torque force or turning force applied to the fastening portion is larger than a bearable or predetermined structural force on the corresponding fastened portion to prevent the corresponding fastened portion or the fastening portion from being damaged or failure.

A fourth aspect of the present invention provides a fittable and releasable fastener, comprising: a head and a fitting and releasing piece. The head has at least one fitted and released portion and a fastening portion, the head has a limiting portion, and the limiting portion combines moveably with a corresponding limiting portion provided by a body portion; and the fitting and releasing piece has at least one fitting and releasing portion, and the fitting and releasing portion fits to the fitted and released portion, the fitting and releasing piece or the head is applied with an external force to make the fitting and releasing portion release the fitted and released portion for limiting the force or the force interval applied on the fastening portion, the fastening portion is used to fasten a corresponding fastened portion, and when the force is applied to the head to drive the fastening portion, the fitting and releasing portion releases the fitted and released portion before the torque force or turning force applied to the fastening portion is larger than a predetermined force on the fastening portion.

To achieve at least the above objective, the present disclosure provides a fittable and releasable fastener, when the fitting and releasing portion fits to the fitted and released portion, an external turning force is applied to the fitting and releasing piece to make the fastening portion combine with at least one object. After the fastening portion is combined with the object, the fitting and releasing portion would release the fitted and released portion to limit the force or the force interval applied on the fastening portion for preventing excessively locking if the force is continuously applied.

DETAILED DESCRIPTION OF THE INVENTION

To facilitate understanding of the object, characteristics and effects of this present disclosure, embodiments together with the attached drawings for the detailed description of the present disclosure are provided.

Figure 1:
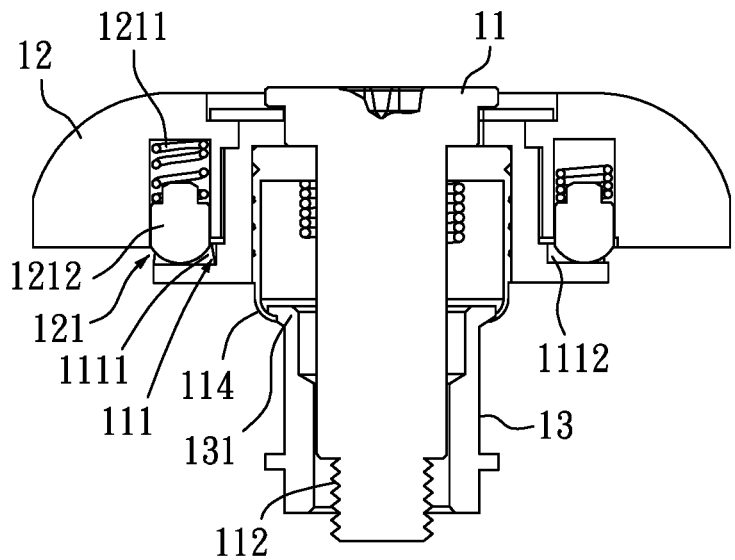
FIG. 1 is a schematic view of sectional state illustrating a fittable and releasable fastener according to the first embodiment of the present disclosure.
Figure 2:
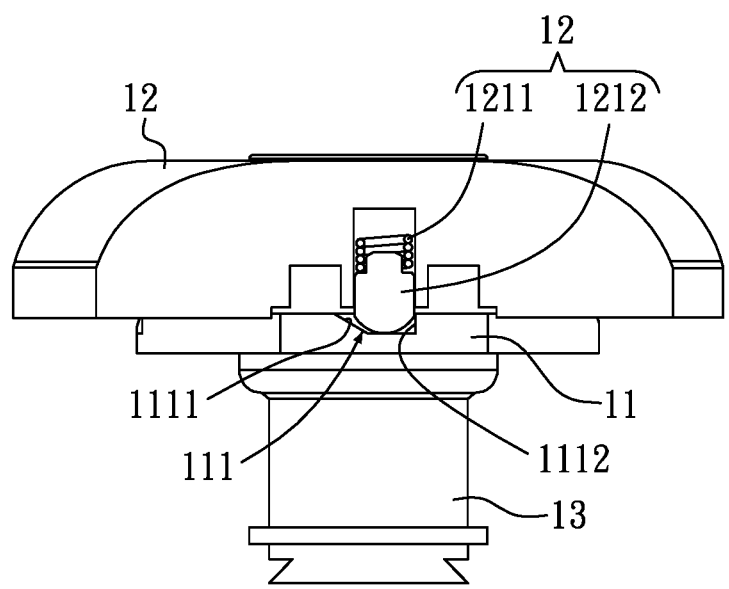
FIG. 2 is a schematic view of sectional state illustrating a fittable and releasable fastener according to the second embodiment of the present disclosure.

Referring to FIGS. 1 and 2, as shown in the drawings, the invention provides a fittable and releasable fastener 1 comprising a head 11 and a fitting and releasing piece 12.

The head 11 has at least one fitted and released portion 111 and a fastening portion 112. The head 11 and the fastening portion 112 are integrally formed. The head 11 has a limiting portion 114, and the limiting portion 114 combines moveably with a corresponding limiting portion 131 provided by a body portion 13.

The fitting and releasing piece 12 has at least one fitting and releasing portion 121, and the fitting and releasing portion 121 fits to the fitted and released portion 111. The fitting and releasing piece 12 (or the head 11) is applied with an external force to make the fitting and releasing portion 121 release the fitted and released portion 111 for limiting the force or the force interval applied on the fastening portion 112. In an embodiment of the invention, the fitting and releasing portion 121 may be a convex body, the fitted and released portion 111 may be a concave body, and the fastening portion 112 may be a thread body. In addition, the number of the fitting and releasing portion 121 and the fitted and released portion 111 may be one or more.

In addition, a second aspect of the invention provides a fitting and releasing method of a fittable and releasable fastener 1 which comprises steps as follows: providing a fittable and releasable fastener 1, which includes a head 11 and a fitting and releasing piece 12, the head 11 has at least one fitted and released portion 111 and a fastening portion 112, the fitting and releasing piece 12 has at least one fitting and releasing portion 121, and the fitting and releasing portion 121 fits to the fitted and released portion 111; and applying an external force to the fitting and releasing piece 12 (or the head 11) to deform the fitting and releasing portion 121 or the fitted and released portion 111 to release each other for limiting the force or the force interval that is applied on the fastening portion 112 by the fitted and released portion 111, the fastening portion 112 is used to fasten a corresponding fastened portion (not shown in the drawings), and when the force is applied to the head 11 to drive the fastening portion 112, the fitting and releasing portion 121 would release the fitted and released portion 111 before the torque force or turning force applied to the fastening portion 112 is larger than a predetermined force on the fastening portion 112.

The fittable and releasable fastener 1 of the invention can be used to combine at least two objects (not shown in the drawings). When two objects are combined, the fastening portion 112 is aligned with a screw hole of the object, and an external turning force is applied to the fitting and releasing piece 12 to make the fastening portion 112 screw into the two objects for combining under the circumstance of the fitting and releasing portion 121 fitting to the fitted and released portion 111. After the fastening portion 112 is combined with the object, the fitting and releasing portion 121 would release the fitted and released portion 111 to deform the fitting and releasing piece 12 if the force is continuously applied to the fitting and releasing piece 12, and after the fitting and releasing portion 121 fits to the fitted and released portion 111 again to revert the fitting and releasing piece 12 to the original state for limiting the force or the force interval applied on the fastening portion 112 to prevent excessively locking.

In an embodiment of the invention, the number of the fitting and releasing portion 121 and the fitted and released portion 111 of the fittable and releasable fastener 1 may be two, the fitted and released portion 111 is provided on the top surface of the head 11, and the fitting and releasing portion 121 is provided on the bottom of the fitting and releasing piece 12. The fitting and releasing portion 121 of the fitting and releasing piece 12 comprises an elastomer 1211 and a pusher 1212, the fitted and released portion 111 of the head 11 is a groove, and the fitted and released portion 111 has a fitting and releasing surface 1111 and a stopping surface 1112. Because the fitting and releasing surface 1111 and the stopping surface 1112 have different angles, when the pusher 1212 is fitted to or removed from the fitted and released portion 111, the fitting and releasing surface 1111 and the stopping surface 1112 with different angles can produce different turning forces which can drive the force for the fastening portion 112 screwing into an object smaller than the force for the pusher 1212 removing the fitted and released portion 111 so that a direction of the fitting and releasing surface 1111 may allow the pusher 1212 to pass and the head 11 is fittably and releasably turning, and a direction of the stopping surface 1112 may limit the pusher 1212 and the head 11 is restrained from turning. Also, the pusher 1212 may be an arc surface body, spherical body or curved surface body, and can be driven or turned by a less force along a bevel, curved surface or arc surface of the fitting and releasing surface 1111. The stopping surface 1112 is a vertical surface, step surface or a bevel, curved surface or arc surface with an angle larger than that of the fitting and releasing surface 1111 for stopping and restraining the pusher 1212 from turning, or restraining the pusher 1212 from moving with a force larger than that of the pusher 1212 driving the fitting and releasing surface 1111. When a force is applied to the head 11 to drive the fastening portion 112 for removing the locking or fastening, the fitting and releasing portion 121 would release the fitted and released portion 111 along the fitting and releasing surface 1111 before the torque force or turning force applied to the fastening portion 112 is larger than a predetermined force on the fastening portion 112. Accordingly, the force or the force interval applied on the fastening portion 112 also can be limited to prevent excessively locking, and the invention can further meet the requirement of practical application.

In addition, the fitting and releasing surface 1111 is a bevel, curved surface, arc surface, step surface, plane or surface of revolution. Also, the fitted and released portion 111 may comprise an elastomer and a pusher, the fitting and releasing portion 121 of the fitting and releasing piece 12 is a groove, and the fitting and releasing portion 121 has a fitting and releasing surface and a stopping surface (not shown in the drawings). Accordingly, the invention can further meet the requirement of practical application.

It is found from the above that the fastening portion 112 is used to fasten the corresponding fastened portion (not shown in the drawings). When the force is applied to the head 11 to drive the fastening portion 112 for the locking or fastening, the fitting and releasing portion 121 would release the fitted and released portion 111 along the fitting and releasing surface 1111 before the torque force or turning force applied to the fastening portion 112 is larger than a bearable structural force on the corresponding fastened portion to prevent the corresponding fastened portion from being damaged by the fastening portion 112 or failure.

In addition, When a force is applied to the head 11 to drive the fastening portion 112 for removing the locking or fastening, the fitting and releasing portion 121 would abut against the stopping surface 1112 so that the torque force or turning force applied to the fastening portion 112 is transferred to the stopping surface 1112 by the fitting and releasing portion 121 for removing the locking or fastening of the fastening portion 112 to the corresponding fastened portion. Also, when the torque force or turning force applied to the fastening portion 112 is transferred to the stopping surface 1112 by the fitting and releasing portion 121, the force transferred to the stopping surface 1112 is larger than the fitting and releasing force of entering for lockably fastening or turnably fastening the fitting and releasing portion 121 and the fitted and released portion 111 in another direction, for removing the locking or fastening of the fastening portion 112 to the corresponding fastened portion.

Referring to FIG. 2, as shown in the drawing, in the embodiment, the number of the fitting and releasing portion 121 and the fitted and released portion 111 of the fittable and releasable fastener 1 may be one, the fitted and released portion 111 is provided at two sides of the head 11, and the fitting and releasing portion 121 is provided at two sides of the bottom of the fitting and releasing piece 12. In addition, the fitted and released portion 111 has a fitting and releasing surface 1111 and a stopping surface 1112, and the fitting and releasing portion 121 of the fitting and releasing piece 12 comprises an elastomer 1211 and a pusher 1212. The direction of the fitting and releasing surface 1111 may allow the pusher 1212 to pass and the head 11 is fittably and releasably turning, and the direction of the stopping surface 1112 may limit the pusher 1212 and the head 11 is restrained from turning. Accordingly, the invention can further meet the requirement of practical application.

Figure 3:
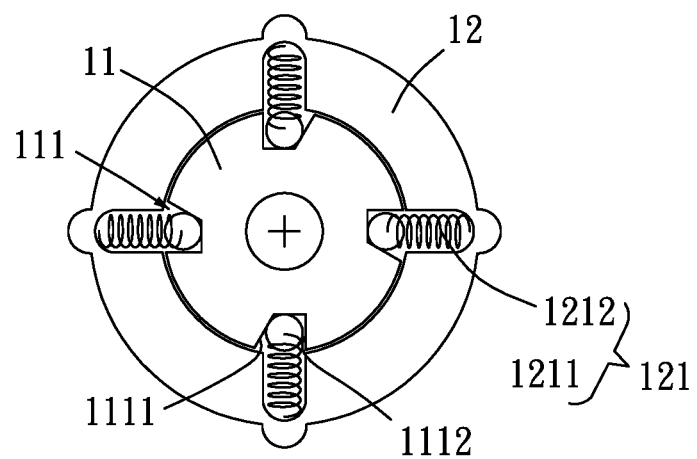
FIG. 3 is a schematic top view illustrating a fittable and releasable fastener according to the third embodiment of the present disclosure.
Figure 4:
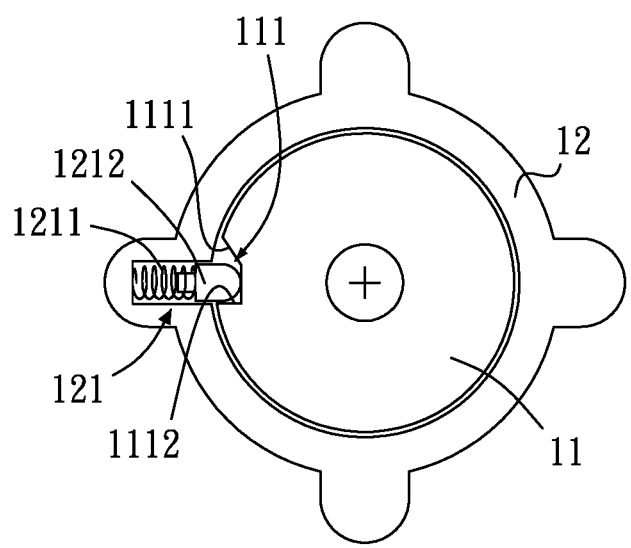
FIG. 4 is a schematic top view illustrating a fittable and releasable fastener according to the fourth embodiment of the present disclosure.

Referring to FIGS. 3 and 4, as shown in the drawings, in the embodiment, the number of the fitting and releasing portion 121 and the fitted and released portion 111 of the fittable and releasable fastener 1 may be four (shown as FIG. 3), or the number of the fitting and releasing portion 121 and the fitted and released portion 111 of the fittable and releasable fastener 1 may be one (shown as FIG. 4), the fitted and released portion 111 has a fitting and releasing surface 1111 and a stopping surface 1112, and the fitting and releasing portion 121 of the fitting and releasing piece 12 comprises an elastomer 1211 and a pusher 1212. The direction of the fitting and releasing surface 1111 may allow the pusher 1212 to pass and the head 11 is fittably and releasably turning, and the direction of the stopping surface 1112 may limit the pusher 1212 and the head 11 is restrained from turning. Accordingly, the invention can further meet the requirement of practical application.

While the present disclosure has been described by means of specific embodiments, numerous modifications and variations could be made thereto by those skilled in the art without departing from the scope and spirit of the present disclosure set forth in the claims.

What is claimed is:

1. A fittable and releasable fastener, comprising:
   a head, having at least one fitted and released portion and a fastening portion, the head having a limiting portion, and the limiting portion combines moveably with a corresponding limiting portion provided by a body portion; and
   a fitting and releasing piece, having at least one fitting and releasing portion, and the fitting and releasing portion fitting to the fitted and released portion, the fitting and releasing piece or the head being applied with an external force to make the fitting and releasing portion release the fitted and released portion for limiting the force or the force interval applied on the fastening portion;
   wherein the fitting and releasing portion or the fitted and released portion comprises an elastomer and a pusher.

2. The fittable and releasable fastener according to claim 1, wherein the pusher is an arc surface body, spherical body or curved surface body, and the pusher can be driven or turned by a less force along a bevel, curved surface or arc surface of the fitting and releasing surface.

3. The fittable and releasable fastener according to claim 1, wherein the fitting and releasing portion or the fitted and released portion has a fitting and releasing surface and a stopping surface, a direction of the fitting and releasing surface is fittably and releasably turning, and a direction of the stopping surface is restrained from turning.

4. The fittable and releasable fastener according to claim 3, wherein the stopping surface is a vertical surface, step surface or a bevel, curved surface or arc surface with an angle larger than that of the fitting and releasing surface for stopping and restraining the pusher from turning, or restraining the pusher from moving with a force larger than that of the pusher driving the fitting and releasing surface.

5. The fittable and releasable fastener according to claim 1, wherein when the force is applied to the head to drive the fastening portion for the locking or fastening, the fitting and releasing portion releases the fitted and released portion along a fitting and releasing surface before the torque force or turning force applied to the fastening portion is larger than a bearable structural force on the corresponding fastened portion to prevent the corresponding fastened portion from being damaged by the fastening portion or failure.

6. The fittable and releasable fastener according to claim 1, wherein when the force is applied to the head to drive the fastening portion for removing the locking or fastening, the fitting and releasing portion abuts against a stopping surface so that the torque force or turning force applied to the fastening portion is transferred to the stopping surface by the fitting and releasing portion for removing the locking or fastening of the fastening portion to the corresponding fastened portion.

7. The fittable and releasable fastener according to claim 1, wherein when the force is applied to the head to drive the fastening portion for removing the locking or fastening, the fitting and releasing portion abuts against a stopping surface so that the torque force or turning force applied to the fastening portion is transferred to the stopping surface by the fitting and releasing portion, the force transferred to the stopping surface is larger than the fitting and releasing force of entering for lockably fastening or turnably fastening the fitting and releasing portion and the fitted and released portion in another direction, for removing the locking or fastening of the fastening portion to the corresponding fastened portion.

8. The fittable and releasable fastener according to claim 1, wherein when the force is applied to the head to drive the fastening portion for removing the locking or fastening, the fitting and releasing portion releases the fitted and released portion along a fitting and releasing surface before the torque force or turning force applied to the fastening portion is larger than the predetermined force on the fastening portion.

9. A fittable and releasable fastener, comprising:
a head, having at least one fitted and released portion and a fastening portion; and
a fitting and releasing piece, having at least one fitting and releasing portion, and the fitting and releasing portion fitting to the fitted and released portion, the fitting and releasing piece or the head being applied with an external force to make the fitting and releasing portion release the fitted and released portion for limiting the force or the force interval applied on the fastening portion, the fastening portion used to fasten a corresponding fastened portion, and when the force is applied to the head to drive the corresponding fastened portion, the fitting and releasing portion releases the fitted and released portion before the torque force or turning force applied to the fastening portion is larger than a bearable or predetermined structural force on the corresponding fastened portion.

10. A fittable and releasable fastener, comprising:
a head, having at least one fitted and released portion and a fastening portion; and
a fitting and releasing piece, having at least one fitting and releasing portion, and the fitting and releasing portion fitting to the fitted and released portion, the fitting and releasing piece or the head being applied with an external force to make the fitting and releasing portion release the fitted and released portion for limiting the force or the force interval applied on the fastening portion, the fastening portion used to fasten a corresponding fastened portion, and when the force is applied to the head to drive the fastening portion for the locking or fastening, the fitting and releasing portion releases the fitted and released portion along a fitting and releasing surface before the torque force or turning force applied to the fastening portion is larger than a bearable or predetermined structural force on the corresponding fastened portion to prevent the corresponding fastened portion or the fastening portion from being damaged or failure.

11. A fittable and releasable fastener, comprising:
a head, having at least one fitted and released portion and a fastening portion, the head having a limiting portion, and the limiting portion combines moveably with a corresponding limiting portion provided by a body portion; and
a fitting and releasing piece, having at least one fitting and releasing portion, and the fitting and releasing portion fitting to the fitted and released portion, the fitting and releasing piece or the head being applied with an external force to make the fitting and releasing portion release the fitted and released portion for limiting the force or the force interval applied on the fastening portion, the fastening portion used to fasten a corresponding fastened portion, and when the force is applied to the head to drive the fastening portion, the fitting and releasing portion releases the fitted and released portion before the torque force or turning force applied to the fastening portion is larger than a predetermined force on the fastening portion.

* * * * *